Figure 1:
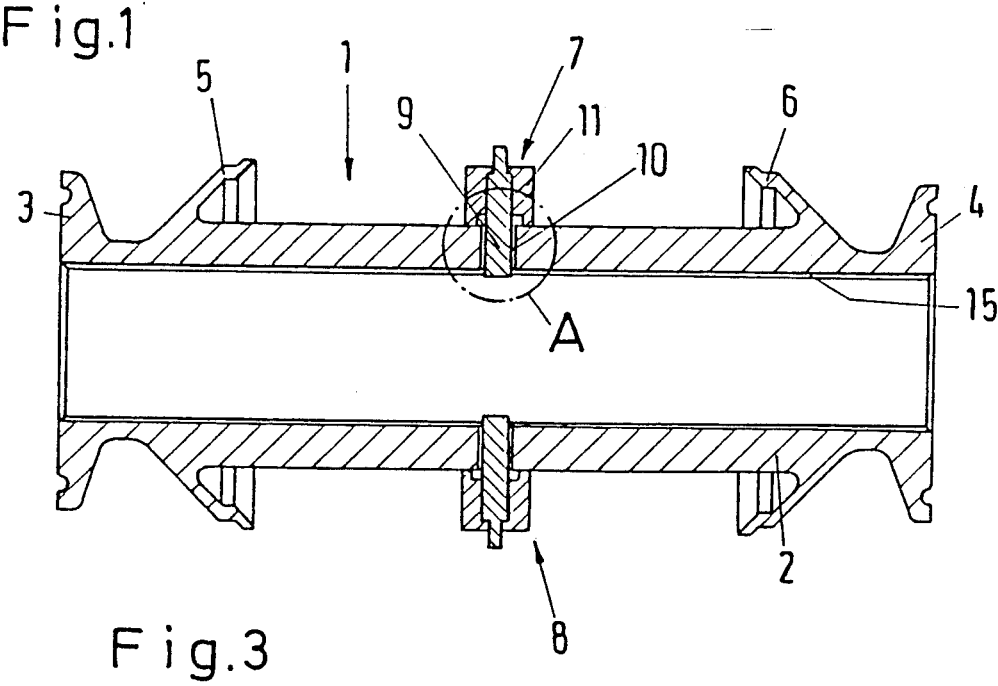

United States Patent [19]

Hansen et al.

[11] Patent Number: 5,062,305

[45] Date of Patent: Nov. 5, 1991

[54] METHOD OF MAKING A MEASURING TUBE FOR AN ELECTROMAGNETIC FLOW METER, AND THE MEASURING TUBE

[75] Inventors: Henry Hansen, Grasten; Leif Studsgaard, Augustenborg; Erik Laursen, Nordborg, all of Denmark

[73] Assignee: Danfoss A/S, Nordborg, Denmark

[21] Appl. No.: 530,907

[22] Filed: May 29, 1990

[30] Foreign Application Priority Data

Jun. 2, 1989 [DE]  Fed. Rep. of Germany ....... 3917975

[51] Int. Cl.⁵ .............................................. G01F 1/58
[52] U.S. Cl. ................................ 73/861.12; 29/602.1; 29/DIG. 14
[58] Field of Search ......................... 73/861.11, 861.12; 29/602.1, DIG. 14

[56] References Cited

U.S. PATENT DOCUMENTS

| | | | |
|---|---|---|---|
| 2,766,621 | 10/1956 | Raynsford et al. | 73/861.12 |
| 4,388,834 | 6/1983 | Schmoock | 73/861.12 |
| 4,631,969 | 12/1986 | Schmoock | 73/861.12 |

FOREIGN PATENT DOCUMENTS

| | | | |
|---|---|---|---|
| 0035224 | 2/1987 | Japan | 73/861.11 |
| 3028880 | 2/1988 | Japan | 29/DIG. 14 |
| 2068122 | 8/1981 | United Kingdom | 73/861.12 |

*Primary Examiner*—Charles A. Ruehl
*Attorney, Agent, or Firm*—Wayne B. Easton; Clayton R. Johnson

[57] ABSTRACT

The measuring tube is for an electromagnetic flow meter and has a tube member made of a non-magnetic material that is provided with opposite through passages that have electrodes extended therethrough. An insulating lining of an enamel priming layer coats the inner surface of the tube member and fills the gaps between the electrodes and the tube member surfaces defining the through passages, the lining also including an covering enamel layer covering the priming layer surface that is within the tube member interior. The end faces of the electrodes that are in the tube member interior have the enamel material cleared therefrom. The priming layer may be formed by filling the tube member with a priming enamel slip, pouring out the slip material, cleaning the electrode end surfaces that are within the tube member interior and then heating to melt the slip material and then cooling. The covering layer may be formed by the same steps.

16 Claims, 1 Drawing Sheet

METHOD OF MAKING A MEASURING TUBE FOR AN ELECTROMAGNETIC FLOW METER, AND THE MEASURING TUBE

The invention relates to a method of making a measuring tube for an electromagnetic flow meter comprising a tube member of non-magnetic metal such as stainless steel, metal electrodes arranged in throughpassages, and a continuous lining of meltable electrically non-conductive material covering the inner circumferential surfaces of the tube member and throughpassages, and to a measuring tube which has in particular been made according to this method.

Measuring tubes of the kind here in question are known from GB-PS 20 68 122. In that case, the lining consists of a thick glass layer which also extends with a reduced thickness along the wall of the throughpassages. The metal electrode terminates in the middle of the wall of the tube member. The electric connection to the interior of the tube is made with the aid of a molten-in plug of electrically conductive glass with a similar chemical structure as that of the lining. There are no directions as to manufacture. In particular, there is a danger of intermerging flow and mixing of the two glass compositions which differ only with respect to their electric behavour.

The invention is based on the problem of providing a measuring tube with a continuous insulating lining of the aforementioned kind that can be made in a simple manner and with a reproducibility suitable for mass production.

This problem is solved according to the invention by the method steps a) that the electrodes are so fixed in the throughpassages that they project inwardly beyond the inner surface of the tube member, b) that the inner surface of the tube member and the entire gap between each electrode and the associated throughpassages are provided with an enamel priming slip, c) that the end face of the electrodes is cleared of the enamel priming slip, and d) that the priming enamel is melted by heating and then cooled again.

When introducing the enamel priming slip, it is inevitable for the end faces of the electrodes to become at least partially covered by it. The cleaning step ensures that the end face of the finished measuring tube will produce a direct conductive connection to the fluid to be measured. Since the electrode projects inwardly, it can be easily cleaned and, in the finished measuring tube, it will pass through the enamel layer.

The priming enamel cannot only be selected for its properties so that it adheres well to the material of the tube member and is compatible therewith as far as temperature expansion is concerned. The slip can also be set with regard to its viscosity so that it forms a layer when applied to the inner face of the measuring tube and at the same time penetrates the gap between each electrode and the associated throughpassage without running out of the latter again. Further, the specific weight of the slip can be set so that the volume of the slip introduced into the gap will be reduced by no more than a permissible extent during melting. The continuous priming enamel layer so formed produces a measuring tube that meets high requirements.

The following additional method steps are particularly favourable:

e) that the inner surface of the tube member coated with the priming enamel is provided with a slip of covering enamel, f) that the end face of the electrodes is cleaned of the slip of covering enamel, g) that the covering enamel slip is melted by heating and subsequently cooled again.

The covering enamel can be selected to be different from the priming enamel that produces the continuous electric insulation, so that it will be adapted to a particular application. Thus, it may form a coating which is resistant to acids or bases. It may be selected so that it will not influence the fluid to be measured, which is, for example, important in the food industry. In addition, the covering layer may compensate the thickness of the lining if the priming enamel layer is only thin because of its low viscosity required to penetrate into the gap.

A preferred possibility of performing the method step b) or e) is to close one end of the tube member and, if the closure is at the bottom, to fill it with the slip, whereupon the slip is poured out leaving behind the parts adhering to the tube member. This leads to a uniform coating and certain filling of the gap between the electrode and throughpassage.

It is advisable for the slip to be dried after the stated method step. Even short drying periods of fractions of a minute are sufficient to improve the viscosity and adhesive to such an extent that the application will not be detrimentally influenced during subsequent cleaning.

For the cleaning itself, there are a multitude of possibilities. In particular, a brush or a carrier provided with an abrasive may be introduced into the tube member.

Adhesion is improved if all the parts to be covered with enamel and at least the inner face of the tube member are roughened before the method step a). A roughness of more than 3.2 $\mu$m is recommended.

It is also favourable for the tube member to be annealed without stress prior to method step a). This prevents the enamel layers from fracturing subsequently as a result of stresses caused by temperature influences.

Advantageously, the priming enamel slip is set to a much lower viscosity than the covering enamel slip. This ensures that the priming enamel slip is sure to penetrate into the gap between the electrode and throughpassage and yet an adequate thickness of enamel layer is produced everywhere.

A measuring tube for an electromagnetic flow meter comprising a tube member of non-magnetic metal such as stainless steel, metal electrodes arranged in throughpassages, and a continuous lining of meltable electrically non-conductive material covering the inner surfaces of the tube member and the throughpassages and made in particular according to the previously described method is characterised according to the invention in that the lining consists of a continuous priming enamel layer which covers the inner faces of the tube member and the entire gap between each electrode and the associated throughpassage, and a covering enamel layer which covers the inner surfaces of the priming enamel layer, the electrodes projecting beyond the inner surfaces of the tube member, passing through both enamel layers and having an end which is free from enamel.

Such a measuring tube has a continuous electric insulation, an adequate thickness of enamel layer everywhere, good contact between the metal electrode and the medium to be measured, and good adaptability to the material of the tube member and to the fluid to be measured.

In particular, the electrodes may project radially inwardly beyond the enamel layers. This permits careful cleaning of the end faces of the electrodes without the slip application being detrimentally influenced. In addition, the projecting electrode parts produce eddies in the fluid to be measured so that subsequent soiling will be prevented.

In a preferred example, the thickness of the priming enamel layer is only a fraction of the gap width and the thickness of the covering enamel layer. The thinness of the priming enamel layer results from the viscosity required for penetration of the slip into the gap and is balanced out by the thickness of the covering enamel layer.

It is also recommended that the inner surface of the tube member at the ends is provided with a respective inwardly projecting circumferential rib of which the radial height is substantially equal to the thickness of both enamel layers. In this way, a uniform thickness of enamel is ensured up to the ends of the tube member.

The mounting of the electrode required during production of the measuring tube can be removed after production. However, it often facilitates handling if the mounting is left on the measuring tube.

Such a construction can be so that the electrode is held in an electrically non-conductive plug inserted in a sleeve attached to the tube member.

It is in this case recommended that the sleeve be of steel, be welded into the tube member and form the throughpassage. An acid proof steel should be used so that it meets all requirements.

The plug may be of ceramic. Since sealing is effected by the enamel in the gap surrounding the electrode, it is sufficient for the ceramic plug to hold the electrode mechanically.

Figure 3:
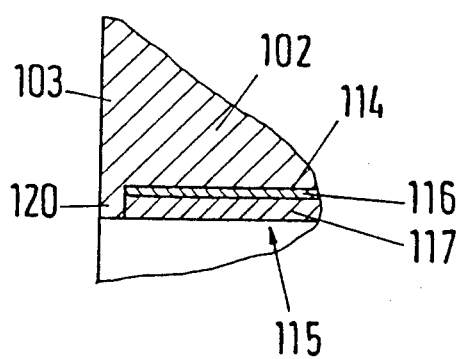
Figure 2:
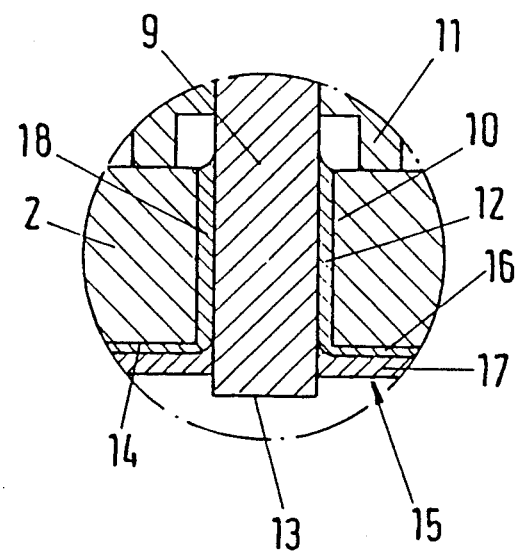
Figure 4:
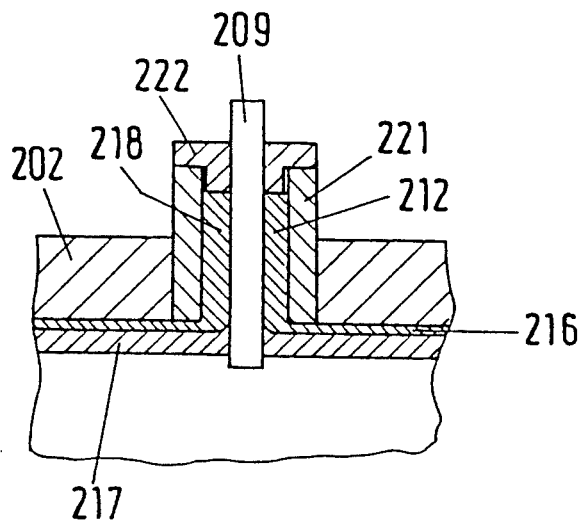

Preferred examples of the invention will now be described in more detail with reference to the drawing wherein:

FIG. 1 is a longitudinal section through a measuring tube made in accordance with the invention, FIG. 2 is an enlarged representation of detail A in FIG. 1, FIG. 3 is a modification of one end of the tube, and FIG. 4 shows a modified form for the electrode attachment.

The measuring tube 1 in FIG. 1 comprises a tube member 2 of non-magnetic stainless steel. At the ends, it carries two connecting flanges 3 and 4. Two further inwardly disposed flanges 5 and 6 serve to secure the measuring tube in an outer sleeve and the interposed saddle coils.

Two electrode arrangements 7 and 8 provided on opposed sides have the same construction as will be described in conjunction with FIG. 2. A rod-form metal electrode 9 passes through a throughpassage 10 and is held in two parts by a holder 11 in the illustrated central position so that a concentric gap 12 remains between the electrode and the inner surface of the throughpassage. The end face 13 of the electrode 9 projects radially inwardly beyond the inner surface 14 of the tube member 2.

A lining 15 consists of a priming enamel layer 16 and a thicker covering enamel layer 17. In the gap 12 there is a priming enamel layer 18 which is continuous with the layer 16.

Both enamel layers are electrically insulating. The priming enamel layer is adapted to the material of the measuring tube 2 as far as thermal expansion is concerned and is adequately adherent with respect thereto. The covering enamel layer 17 consists of an enamel which is adapted for the particular application.

The following procedure may be adopted for manufacture:

1. The tube member 2 of stainless steel is annealed in order to make it stress free.

2. All parts are degreased. Their surface is roughened by sand blasting or etching. The inner surface 14 of the tube member 2 should have a roughness greater than 3.2 $\mu$m.

3. The electrodes 8 and 9 are mounted on the tube member 2 with the aid of the holders 11 so that they project inwardly beyond the inner surface 14 of the tube member 2.

4. A priming enamel slip has its viscosity set so that it still penetrates into the gap 12 during application. This also defines the thickness of the subsequent priming enamel layer 16.

5. The priming enamel is applied to the inner surface 14 of the tube member 2 and filled into the gap 12. This can, for example, be effected in that the tube member 2 is closed at the flange 3, filled completely with the priming enamel slip and the latter is finally poured out again. A defined amount of priming enamel slip then remains on the inner surface 14 and in the gap 12.

6. The priming enamel slip is dried in an airing cupboard, for example for 20 minutes. This leads to an increase in the viscosity of the slip and to corresponding stronger adhesion to the tube member 2.

7. The end face 13 is cleaned of priming enamel slip adhering thereto. This can be done with a brush or with a carrier provided with abrasive, for example a sponge.

8. The whole is then heated in an oven and the priming enamel flows together. In a practical test, heating lasted eight minutes and took place up to 820° C.

9. A covering enamel slip has its viscosity set so that it will later provide the desired thickness of layer.

10. This covering enamel slip is applied to the priming enamel slip 16. This can again take place so that the tube member 2 is closed at one end, filled with this covering enamel slip, whereupon the latter is poured out again.

11. The covering enamel slip is dried in an air drying cupboard.

12. The excess covering enamel slip is removed from the end 13 of the electrode 9.

13. The whole is again heated in an oven until the covering enamel flows together.

14. The mountings 11 are removed.

15. The finished measuring tube is tested for leakproofness in a leakage test.

In one embodiment, the priming enamel layer 16 had a thickness of 0.06 to 0.07 mm and the gap 12 had a width of 0.5 mm. The covering enamel layer had a thickness of 0.23 to 0.24 mm so that the lining 15 had a total thickness of 0.3 mm. The electrode 13 projeced by 0.7 mm beyond the inner surface 14 of the tube member 2, i.e. by 0.4 mm beyond the lining 15.

Whereas the thickness of the lining 15 decreases at the ends, the FIG. 3 modification shows that the tube member 102 has an inner circumferential rib 120 at its flange 103. In this way, the lining 115 can retain a uniform thickness up to its ends. This avoids pockets and the like in which dirt might accumulate. This is of interest in the food industry.

In the FIG. 4 embodiment, a sleeve 221 of acid proof steel is welded into a tube member 202. The sleeve carries a ceramic plug 222 serving as a holder for the electrode 209. The gap 212 is now formed between the electrode 209 and the inner surface of the sleeve 221. The application of the priming enamel layer 216, the gap filling 218 and the covering enamel layer 217 takes place in the same way as was described in conjunction with FIGS. 1 and 2.

In one embodiment, the priming enamel was a glass enamel and the covering enamel was a glass enamel with chromium oxide pigments. Such enamels are conventional in the trade. The temperature coefficient of the priming enamel was between that of the tube member and that of the covering enamel, so that detachment of the enamel during heating is avoided.

We claim:

1. A method of making a measuring tube for an electromagnetic flow meter wherein the measuring tube has a tube member made of a non-magnetic material such as stainless steel and having an inner circumferential surface and spaced through passages defined by surfaces opening through the tube member inner circumferential surface into the tube member interior, and a continuous lining of meltable electrically non-conductive material covering the inner circumferential surface and the through passages, the steps of
   (a) fixing electrodes to extend through the through passages and radially into the tube member interior in spaced relationship to the through passage surfaces to provide gaps between the electrodes and the passage surfaces and with the electrode end faces located in the tube member interior,
   (b) applying enamel priming slip to circumferential surface and in the entire gaps,
   (c) then clearing the enamel priming slip from the electrode end faces, and
   (d) thereafter heating the enamel priming slip to melt the enamel priming slip and thence cooling the heated priming slip.

2. The method of claim 1 wherein the tube member has a top end and a bottom end, the enamel slip step comprising closing the tube member bottom end, filling the tube member with the enamel slip and thence pouring out the enamel slip to leave a coating of the enamel slip in the tube member.

3. The method of claim 1 wherein between steps (b) and (d), the step of drying the enamel slip.

4. The method of claim 1 wherein the clearing step includes using a brush.

5. The method of claim 1 wherein the clearing step includes introducing an abrasive into the tube member.

6. The method of claim 1 wherein prior to step (a) the step of roughening the tube member circumferential surface.

7. The method of claim 1 wherein prior to step (a) the step of annealing the tube member in a stress free manner.

8. The method of claim 1 wherein the priming slip is covered with a covering enamel slip, next the covering enamel slip is removed from the electrode end faces and thence the covered enamel slip is first heated to melt it and is thence cooled.

9. The method of claim 8 wherein the priming enamel slip is of a much lower viscosity than that of the covering enamel slip.

10. The measuring tube made in accordance to the method of claim 9 wherein the heated and cooled priming enamel slip forms a continuous priming enamel layer covering the circumferential surface and fills the entire gaps, the priming layer having an inner circumferential surface, the heated and cooled covering enamel slip forms a covering layer that covers the priming layer inner surface, the priming and covering layers forming a lining, and the electrodes extend through the lining and have their end faces free from the enamel layers.

11. A measuring tube according to claim 10 wherein the electrodes project radially inward of the layers.

12. A measuring tube according to claim 10 wherein the priming layer is of a thickness only a fraction of each of the gap width and the thickness of the covering enamel layer.

13. A measuring tube according to claim 10 wherein the tube member has axially opposite end portions that includes radially inwardly extending ribs of radial heights corresponding substantially to the thickness of the lining.

14. A measuring tube according to claim 10 wherein there is provided a sleeve attached to the tube member to extend outwardly thereof and having a electrode extended therethrough and a non-conductive plug inserted into the sleeve remote from the tube member and having the last mentioned electrode extended therethrough.

15. A measuring tube according to claim 14 in that the sleeve is made of steel, is welded to the tube member and defines the adjacent through passage.

16. A measuring tube according to claim 14 in that the plug is made of a ceramic material.

* * * * *